April 4, 1961 F. R. DEAN ET AL 2,978,174
COUNTING APPARATUS
Filed Oct. 30, 1958 2 Sheets-Sheet 1

INVENTORS.
FRANKLIN R. DEAN
WILLIAM P. HORTON
ROBERT L. MASSARD
BY
Joseph Weingarten
ATTORNEY United States Patent Office 2,978,174
Patented Apr. 4, 1961

2,978,174
COUNTING APPARATUS

Franklin R. Dean, Needham Heights, William P. Horton, Natick, and Robert L. Massard, Wellesley Hills, Mass., assignors to Computer Control Company, Inc., Wellesley, Mass., a corporation of Massachusetts Filed Oct. 30, 1958, Ser. No. 770,842
9 Claims. (Cl. 235—92)

The present invention relates in general to counters and more particularly concerns apparatus for accumulating the total number of randomly occurring events from different signal sources. Apparatus arranged according to the invention separately counts even simultaneously occurring events to continuously provide an accurate indication of the total number of events.

The significance of the invention is better understood by considering its application to a practical problem. Large city newspapers continuously strive to minimize the time interval between the gathering of news and its availability to the public in printed form. This time interval is reduced by running parallel presses. That is, the same material is printed simultaneously by a number of different presses. With the high cost of newsprint, it is desirable to avoid printing excess copies. On the other hand, since advertising revenue is related to the circulation, enough copies should be printed to supply the demand of readers. It, therefore, is desirable to have an accurate count of the number of copies printed of a particular edition. Moreover, since the presses operate at high speed, the current total must be continuously available. Merely adding the individual count of the different presses is rather slow while simultaneously counting the output of all presses ordinarily leads to inaccuracies since some of the presses deliver copies at the same time.

Accordingly, the present invention contemplates and has as a primary object the provision of apparatus for accurately and continuously providing the total number of parallel occurring events.

It is another object of the invention to provide apparatus for resolving simultaneously occurring events.

It is a further object of the invention to achieve the foregoing object despite the rapid occurrence of such events.

An object of the invention is to achieve the foregoing objects with lightweight compact apparatus reliable in operation, relatively free of complexity, and having low power consumption.

According to the invention, a signal characteristic of each input event from each source thereof is applied to an associated input terminal. Each input signal is first stored in the input portion of storage means. In response to periodic timing signals, the signals stored in the input portion of each storage means is first shifted to an output portion and then transferred in sequence to a counter for accumulating the total count. Thus, even though two signals occur simultaneously on different input terminals, the apparatus resolves the two signals by sampling in sequence the output portion of the storage means.

Other features, objects and advantages of the invention will become apparent from the following specification when read in connection with the accompanying drawing in which.

Figure 1:
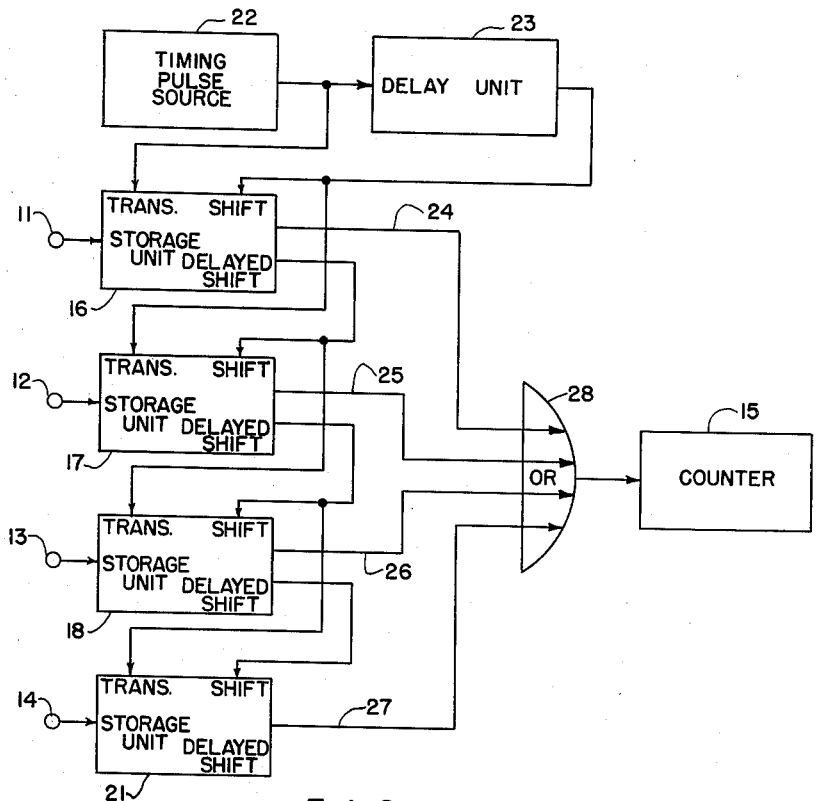
Fig. 1 is a block diagram showing the logical arrangement of an exemplary system arranged according to the invention.

With reference now to the drawing, and more particularly Fig. 1 thereof, there is shown the logical arrangement of an exemplary embodiment of the invention in which parallel occurring events from four sources delivered on terminals 11, 12, 13 and 14 are totaled in counter 15. From the discussion which follows, it will become evident that the number of input signal sources providing randomly occurring events may be increased considerably provided that additional input terminals and storage units are provided for each additional signal source. Only four input terminals are shown in Fig. 1 since this number clearly and sufficiently illustrates the principles of the invention.

Associated with each input terminal is a storage unit, 16, 17, 18 and 21, respectively. Each storage unit has a shift input, a transfer input and a delayed shift output. A timing pulse source 22 delivers a timing pulse to the transfer input of storage unit 16 and the input of delay unit 23. Delay unit 23 delivers a delayed timing pulse to the shift input of storage unit 16 and the transfer input of storage unit 17. The pulse applied to the shift input of each storage unit is delayed and provided at the delayed shift output thereof.

The delayed shift pulse from storage unit 16 is delivered to the shift input of storage unit 17 and the transfer input of storage unit 18. The delayed shift output of storage unit 17 is delivered to the shift input of storage unit 21. The delayed shift output of storage unit 21 is not utilized.

In general, it is seen that the pulse applied to the shift input of one storage unit is applied to the transfer input of the following unit and that the delayed shift pulse is applied to the shift input of the following stage. The transfer input of the first storage unit is energized directly from the timing pulse source. Its shift input is energized by delay unit 23.

The output lines 24, 25, 26 and 27 from storage units 16, 17, 18 and 21, respectively, are applied to respective inputs of buffer 28. The output of buffer 28 is delivered to counter 15 which accumulates the total count of input signals applied to the input terminals.

The foregoing description of the system arrangement should facilitate understanding its mode of operation. Each storage unit has an input portion and output portion. Each input portion temporarily stores an input signal applied to the associated input terminal. When a shift pulse is delivered to a shift input, the stored signal is shifted to the output portion of the storage unit after a delay period furnished by internal delay means. The next transfer pulse applied to the transfer input of a storage unit is then effective in transferring the shifted input signal from the output portion through buffer 28 to counter 15. Although the acceptance of input signals into the input portions of the storage unit may occur simultaneously, only one transfer of a shifted signal in an output portion can occur at any one time since the shift and transfer pulses occur in sequence as a result of the various delays introduced. Each storage unit is energized by a shift pulse and transfer pulse once during the interval between timing pulses. The time interval between timing pulses is less than that between consecutive input signals applied to an input terminal to insure that all input signals are counted.

To illustrate a typical sequence, consider the case where input signals occur simultaneously on terminals 11, 12, 13 and 14. These input signals are first stored in the input portions of storage units 16, 17, 18 and 21, respectively. The next timing pulse from source 22 is delayed by delay unit 23 and by means within the storage unit. This delayed pulse shifts the stored input signal in storage unit 16 from its input portion to its output portion. This delayed pulse is also provided at the delayed shift output of unit 16 and applied to the shift input of storage unit 17. After being further delayed by means within unit 17, this causes the signal stored therein to be shifted from the input portion to the output portion. Next, the delayed shift pulse from storage unit 17 applied to the shift input of storage unit 18 is delayed therein and then causes the input signal stored in storage unit 18 to be shifted from the input portion to the output portion thereof. Finally, the delayed shift pulse from storage unit 18 applied to the shift input of storage unit 21 is delayed therein and then causes the input signal stored in unit 21 to be shifted from its input portion to its output portion, completing the shift operation.

The next timing pulse from source 22, applied to the transfer input of storage unit 16, causes the transfer of the signal now stored in the output portion of storage unit 16 over line 24 through buffer 28 into counter 15. This timing pulse, after being delayed by delay unit 23, is applied to the transfer input of storage unit 17, causing the signal now stored in the output portion thereof to be transferred over line 25 through buffer 28 to counter 15. The next pulse provided at the delayed shift output of storage unit 16 is applied to the transfer input of storage unit 18, causing the signal now stored in its output portion to be transferred over line 26 through buffer 28 to counter 15. Finally, the delayed shift pulse from storage unit 17 is applied to the transfer input of storage unit 21 causing the signal now stored in the output portion thereof to be transferred over line 27 through buffer 28 to counter 15. Thus, it is seen that the input signals applied simultaneously to the input terminals are transferred in sequence to the counter 15. The same pulses which activate a transfer input are also utilized for energizing the shift input of a preceding storage unit as described above in connection with shifting data from the input portion to the output portion of a storage unit.

Figure 2:
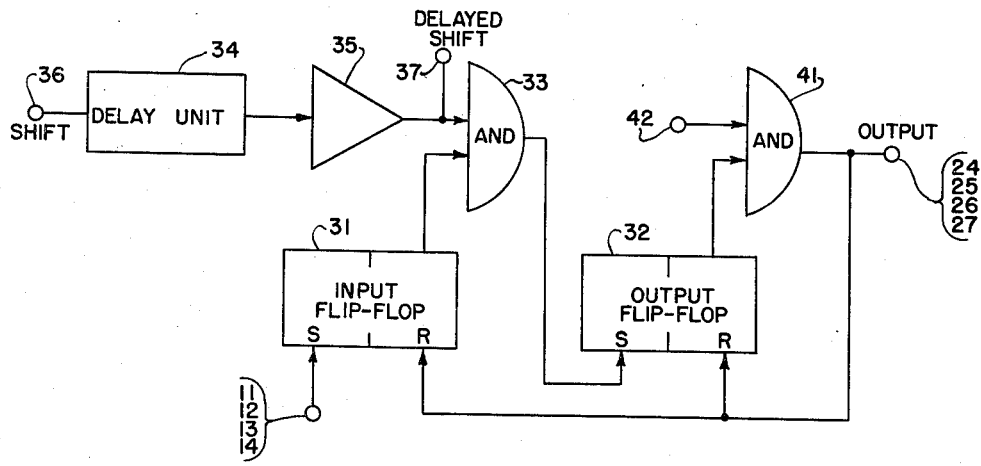
Fig. 2 is a block diagram showing the logical arrangement of the storage means associated with each input terminal.

Referring to Fig. 2, there is illustrated a block diagram showing the logical arrangement of a preferred embodiment of the storage units. Input flip-flop 31 and output flip-flop 32 are the input and output storage portions, respectively. Any of the input terminals 11, 12, 13 or 14 is coupled to the set input of input flip-flop 31. The output of input flip-flop 31 is coupled to one input of gate 33. A delay unit 34 and amplifier 35 are connected in series between the shift input terminal 36 and the other input of gate 33. The delayed shift pulse is provided on terminal 37 after amplification by amplifier 35.

The output of gate 33 is coupled to the set input of output flip-flop 32. The output of output flip-flop 32 is coupled to one input of gate 41. The other input of gate 41 is coupled to the transfer input terminal 42. The output of gate 41 corresponds to output lines 24, 25, 26 and 27 of Fig. 1. The output of gate 41 is connected to the reset inputs of flip-flops 31 and 32.

Operation is as follows: An input signal sets input flip-flop 31, conditioning gate 33 to pass the next shift pulse applied to terminal 36 after delay by delay unit 34 and amplification by amplifier 35. The pulse passed by gate 33 sets output flip-flop 32, conditioning gate 41 to transmit the next transfer pulse received by terminal 42. This gated output pulse also resets flip-flops 31 and 32 so that they are ready to accept the next input signal and deliver it to the output of gate 41 at the proper time.

Figure 3:
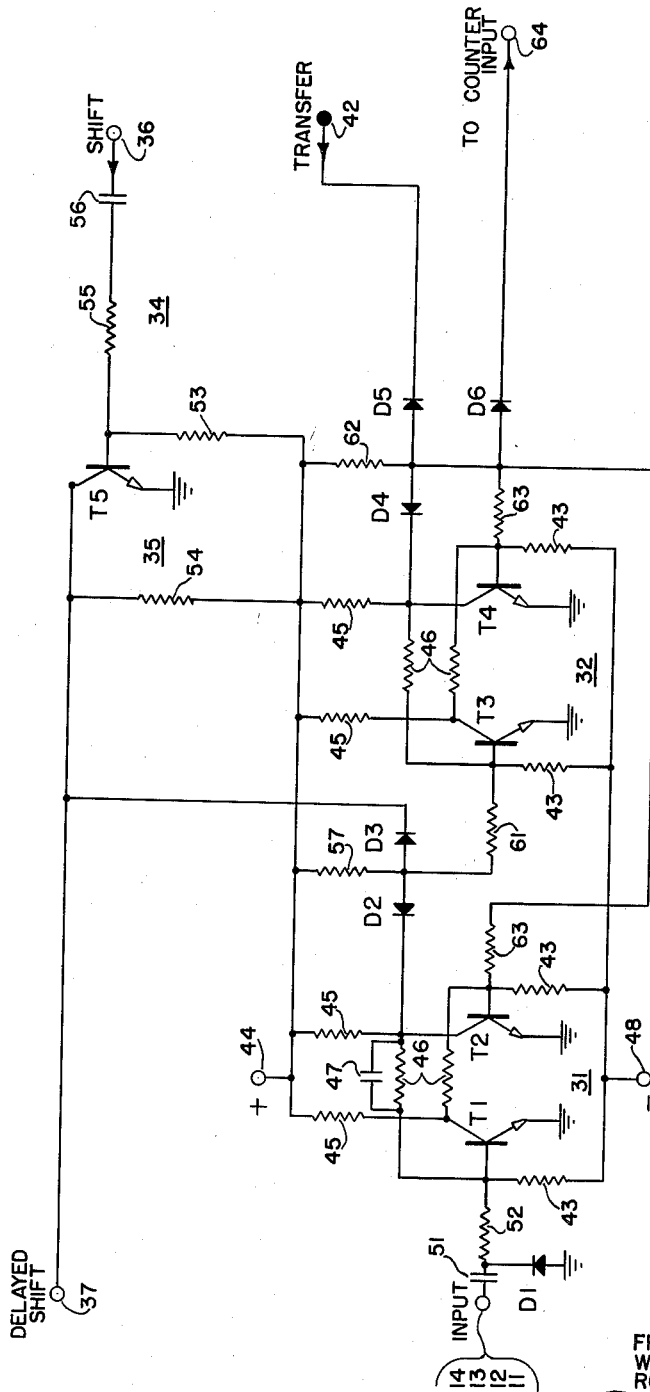
Fig. 3 is a schematic circuit diagram of a preferred embodiment of the storage means whose logical arrangement is shown in Fig. 2.

Referring to Fig. 3, there is illustrated a schematic circuit diagram of a preferred embodiment of the storage unit fully transistorized to conserve power and space while operating with great reliability. The flip-flops 31 and 32 are essentially the same. Each includes a pair of NPN transistors T1 and T2 and T3 and T4, respectively. The base of each transistor is returned to a source of negative potential on terminal 48 through respective resistors 43. The emitter of each transistor is grounded. The collector of each transistor is returned to a source of positive potential on terminal 44 through respective resistors 45. The collector of each transistor in a flip-flop is connected to the base of the other transistor in that pair by a resistor 46. In flip-flop 31, a capacitor 47 bypasses the resistor 46 between the base of transistor T1 and the collector of transistor T2 to accelerate switching.

The input terminal, 11, 12, 13 or 14, is coupled to the base of transistor T1 by a capacitor 51 in series with a resistor 52. A clamping diode D1 clamps the base of the positive input pulses to ground at the junction of capacitor 51 and resistor 52.

NPN transistor T5 and associated components comprise shift pulse amplifier 35. Transistor T5 is normally biased on by biasing resistor 53 connected between terminal 44 and the base of transistor T5. The emitter of transistor T5 is grounded. The collector of transistor T5 is supplied with a positive potential from terminal 44 through load resistor 54.

Shift input terminal 36 is coupled to the base of transistor T5 through resistor 55 in series with capacitor 56. The latter two components comprise delay unit 34. The delayed shift pulse is provided on terminal 37, connected to the collector of transistor T5.

Gate 33 includes diodes D2 and D3 and resistor 57. The junction of the anodes of diodes D2 and D3 is coupled to positive terminal 44 through resistor 57. The cathode of diode D2 is connected to the collector of transistor T2. The cathode of diode D3 is connected to the collector of transistor T5. The junction of diodes D2 and D3 is coupled to the base of transistor T3 by resistor 61.

Diodes D4 and D5 and resistor 62 comprise gate 41. The junction of the anodes of diodes D4 and D5 is coupled to the source of positive potential on terminal 44 by resistor 62. The cathode of diode D4 is connected to the collector of transistor T4. The cathode of diode D5 is connected to the transfer input terminal 42. The junction of diodes D4 and D5 is coupled to the base of transistor T4 and the base of transistor T2 by resistor 63. This junction is also coupled to the counter input terminal 64 by buffer diode D6 which forms a part of buffer 28.

Operation is as follows: Initially, flip-flops 31 and 32 are in the reset state with transistors T1 and T3 non-conductive and transistors T2 and T4 conductive. Under these conditions, the collectors of transistors T2 and T4 are low and diodes D2 and D4 conduct so that no output is provided from gates 33 or 41. A positive input pulse applied to the input terminal is coupled to the base of transistor T1 to set flip-flop 31 by rendering transistors T1 and T2 conductive and non-conductive, respectively. The collector potential on transistor T2 then rises, cutting off diode D2 whereby gate 33 is enabled.

Delay network 34 functions as a differentiator. The leading edge of each positive shift pulse applied to terminal 36 is differentiated to provide a positive spike. This positive spike is clipped by transistor T5 since it is biased to saturation. Differentiating the trailing edge provides a negative spike which cuts off transistor T5 to provide a positive spike on its collector. This rise in collector potential cuts off diode D3, thereby enabling base current to be drawn through resistor 61 to render transistor T3 conductive and transistor T4 non-conductive.

The collector potential of transistor T4 is then high and diode D4 is cut off to enable gate 41. The positive transfer pulse applied to terminal 42 then cuts off diode D5, thereby allowing a current pulse to flow through buffer diode D6 to the counter input terminal 64. This same pulse is applied through resistor 63 to the base of transistors T2 and T4 to render these transistors conductive and return flip-flops 31 and 32 to the reset state.

Representative parameter values are as follows:

| | | |
|---|---|---|
| Terminal 48 potential | volts | −48 |
| Resistor 43 | ohms | 68,000 |
| Terminal 44 potential | volts | +22.5 |
| Resistor 45 | ohms | 6,200 |
| Resistors 46 | do | 15,000 |
| Capacitor 47 | micromicrofarads | 1,000 |
| Capacitor 51 | microfarad | 0.1 |
| Resistor 52 | ohms | 12,000 |
| Resistor 53 | do | 36,000 |
| Resistor 54 | do | 6,200 |
| Resistor 55 | do | 6,200 |
| Capacitor 56 | microfarad | 0.015 |
| Resistor 57 | ohms | 12,000 |
| Resistor 61 | do | 8,200 |
| Resistor 62 | do | 4,300 |
| Resistors 63 | do | 8,200 |

The specific circuits and logical arrangements are by way of example for illustrating the best mode now contemplated for practicing the invention. It is apparent that those skilled in the art may now make numerous modifications of and departures from the specific embodiment described herein without departing from the inventive concepts. Consequently, the invention is to be construed as limited only by the spirit and scope of the appended claims.

What is claimed is:

1. A random event counter comprising, a plurality of input terminals for accepting input signals characteristic of said random events, some of said input signals occurring simultaneously, a storage means coupled to each input terminal, each of said storage means having an input storage portion, an output storage portion, a shift input, a transfer input, and a delayed shift output, each input portion accepting an input signal on its associated terminal and shifting the accepted signal into the output portion in response to a shift pulse applied to said shift input, an output terminal, said output portion transferring said accepted signal to said output terminal in response to a transfer pulse applied to said transfer input, said storage means responding to a shift pulse by providing a delayed shift pulse for application to the shift and transfer inputs of other storage means, a source of timing signals, and means responsive to said timing signals for developing time-spaced shift and transfer pulses for application to the shift and transfer inputs of said storage means to sequentially transfer accepted signals from each storage means to said output terminal.

2. A random event counter comprising, a plurality of input terminals for accepting input signals characteristic of said random events, some of said input terminals being sometimes energized simultaneously, a plurality of storage means each of said storage means having an input storage portion coupled to a different one of said input terminals, an output storage portion, a shift input, a transfer input, a delayed shift output and internal delay means coupling said shift input to said delayed shift output, each input portion accepting an input signal on its associated terminal and shifting the accepted signal into the output portion of the storage means in response to a delayed shift pulse delivered by said internal delay means, an output terminal common to said plurality of storage means, said output portion transferring said accepted signal to said output terminal in response to a transfer pulse applied to said transfer input, a source of timing signals, external delay means for coupling said timing signals to the shift input of the first of said storage means, means for coupling said timing signals to the transfer input of said first storage means, means for coupling the shift input and delayed shift output of each storage means to the transfer input and shift input respectively of a following storage means whereby signals accepted by said storage means are transferred in sequence from each storage means to said output terminal.

3. Apparatus in accordance with claim 2 and further comprising a counter for accumulating a count indicative of the number of output signals delivered to said output terminal.

4. In a random event counter, apparatus comprising, an input flip-flop, an output flip-flop, an output terminal, an input terminal, a source of time-spaced shift and transfer pulses, means responsive to an input signal on said input terminal for setting said input flip-flop, means responsive to said input flip-flop being in a set state and the occurrence of a shift pulse for setting said output flip-flop, and means responsive to said output flip-flop being in the set state and the occurrence of said transfer pulse for providing a signal on said output terminal.

5. Apparatus in accordance with claim 4 and further comprising means responsive to said output terminal signal for resetting said input and output flip-flops.

6. In a random event counter, apparatus comprising, input and output flip-flops having set and reset inputs and providing conditioning potentials at their outputs when set, an input terminal, an output terminal, a shift input, a transfer input, means for coupling said input terminal to said input flip-flop set input, first gating means, means for coupling said input flip-flop output to one input of said first gating means, means for coupling said shift input to the other input of said first gating means, means for coupling the output of said first gating means to said output flip-flop set input, second gating means, means for coupling said output flip-flop output to one input of said second gating means, means for coupling said transfer input to the other input of said second gating means, and means for coupling the output of said second gating means to said output terminal and said input and output flip-flop reset inputs.

7. Apparatus in accordance with claim 6 wherein said means coupling said shift input to said first gating means other input includes a delay unit.

8. Apparatus in accordance with claim 7 wherein said coupling means includes a transistor normally biased to saturation, and a differentiating network coupling said shift input to a control electrode of said transistor, an output electrode of said transistor being connected to said first gating means other input.

9. A parallel to serial converter comprising: a plurality of similar units having their outputs connected through a buffer to a common terminal; each of said units including a signal delay mechanism, a first signal storage device, a second signal storage device, a first gate responsive to coincident outputs from said first storage device and said delay mechanism for coupling the input of said second device to the output of said first device, and a second coincidence gate having its output connected to said common terminal, said second gate having two inputs one of which is coupled to the output of said second storage device; said units being connected to form a consecutive arrangement in which each of said units save the first has its second gate's other input energized by the input to the signal delay mechanism of the preceding unit and the signal delay mechanisms of the units are connected in tandem.

References Cited in the file of this patent

UNITED STATES PATENTS 2,767,908    Thomas    Oct. 23, 1956

OTHER REFERENCES

"High Speed Computing Devices," by Engineering Research Associates Inc., McGraw-Hill Book Co., Inc., New York 1950. Fig. 13-2b and page 267 relied on.